(12) United States Patent
Manickam et al.

(10) Patent No.: US 12,719,791 B2
(45) **Date of Patent: *Aug. 25, 2026**

(54) EFFICIENT HANDLING OF FRAGMENTED PACKETS IN MULTI-NODE ALL-ACTIVE CLUSTERS

(71) Applicant: Cisco Technology, Inc., San Jose, CA (US)

(72) Inventors: Arul Murugan Manickam, San Jose, CA (US); Laxmikantha Reddy Ponnuru, San Ramon, CA (US); Avinash Shah, Pleasanton, CA (US); Vishali Somaskanthan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/946,588

(22) Filed: Nov. 13, 2024

(65) Prior Publication Data

US 2025/0071058 A1 Feb. 27, 2025

Related U.S. Application Data

(63) Continuation of application No. 17/892,691, filed on Aug. 22, 2022, now Pat. No. 12,166,675.

(Continued)

(51) Int. Cl.

*H04L 45/745* (2022.01)
*H04L 47/2483* (2022.01)
*H04L 47/43* (2022.01)

(52) U.S. Cl.

CPC ........ *H04L 45/745* (2013.01); *H04L 47/2483* (2013.01); *H04L 47/43* (2022.05)

(58) Field of Classification Search

CPC ... H04L 45/745; H04L 47/2483; H04L 47/43; H04L 45/76; H04L 47/34; H04L 45/38

See application file for complete search history.

(56) References Cited

U.S. PATENT DOCUMENTS 11,050,668 B2 * 6/2021 Luke ........................ H04L 45/22
11,146,488 B2 * 10/2021 Hao ........................ H04L 12/46

(Continued)

FOREIGN PATENT DOCUMENTS

KR 20160036648 A 4/2016
WO 2018203108 A1 11/2018

OTHER PUBLICATIONS

International Search Report and Written Opinion for International Application No. PCT/US2023/017997, mailed Jul. 14, 2023, 13 Pages.

(Continued)

*Primary Examiner* — Michael Won
(74) *Attorney, Agent, or Firm* — Baker Botts L.L.P.

(57) ABSTRACT

An efficient method to handle fragmented packets in multi-node all-active clusters. In one particular embodiment, a method includes receiving an initial fragment packet at a node in a cluster, creating a secondary flow table, linking the secondary flow table to a primary flow table, determining the primary flow owner of the initial fragment packet, and transmitting initial and succeeding fragment packets out of the cluster through, if possible, the primary flow owner.

20 Claims, 4 Drawing Sheets

Related U.S. Application Data

(60) Provisional application No. 63/332,319, filed on Apr. 19, 2022.

(56) References Cited

U.S. PATENT DOCUMENTS

| | | | | |
|---|---|---|---|---|
| 11,736,407 | B2 * | 8/2023 | Wang | H04L 47/82 |
| 2006/0274773 | A1 | 12/2006 | Cohen et al. | |
| 2009/0110003 | A1 | 4/2009 | Julien et al. | |
| 2009/0316698 | A1 | 12/2009 | Menten | |
| 2013/0336320 | A1 | 12/2013 | Rangaraman | |
| 2013/0339550 | A1 | 12/2013 | Rangaraman et al. | |
| 2014/0016476 | A1 * | 1/2014 | Dietz | H04L 45/127<br>370/392 |
| 2016/0050140 | A1 | 2/2016 | Chinni et al. | |
| 2016/0255048 | A1 | 9/2016 | Ganesh et al. | |
| 2020/0296624 | A1 | 9/2020 | Liu et al. | |
| 2020/0382421 | A1 | 12/2020 | K et al. | |
| 2021/0126863 | A1 | 4/2021 | Ghule et al. | |

OTHER PUBLICATIONS

Office Action for Indian Application No. 202427083970, dated Mar. 12, 2026, 7 Pages.

* cited by examiner

EFFICIENT HANDLING OF FRAGMENTED PACKETS IN MULTI-NODE ALL-ACTIVE CLUSTERS

PRIORITY

This nonprovisional application is a continuation under 35 U.S.C. § 120 of U.S. patent application Ser. No. 17/892,691 filed on Aug. 22, 2022 and entitled "Efficient Handling of Fragmented Packets in Multi-Node All-Active Clusters" which claims priority to U.S. Provisional Patent Application No. 63/332,319 filed on Apr. 19, 2022, all of which is hereby incorporated by reference in its entirety.

TECHNICAL FIELD

The present disclosure relates generally to a field of wide area networks and, more particularly, to efficient handling of fragmented packets in multi-node all-active clusters.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth) that are operable on a large scale. In trying to achieve these goals, a common approach taken by many communications providers is to use asymmetrical routing of traffic and Virtual Fragmentation Reassembly (VFR). However, conventional approaches can lead to costly operations and extraneous bandwidth usage.

DESCRIPTION OF EXAMPLE EMBODIMENTS

Overview

Figure 1:
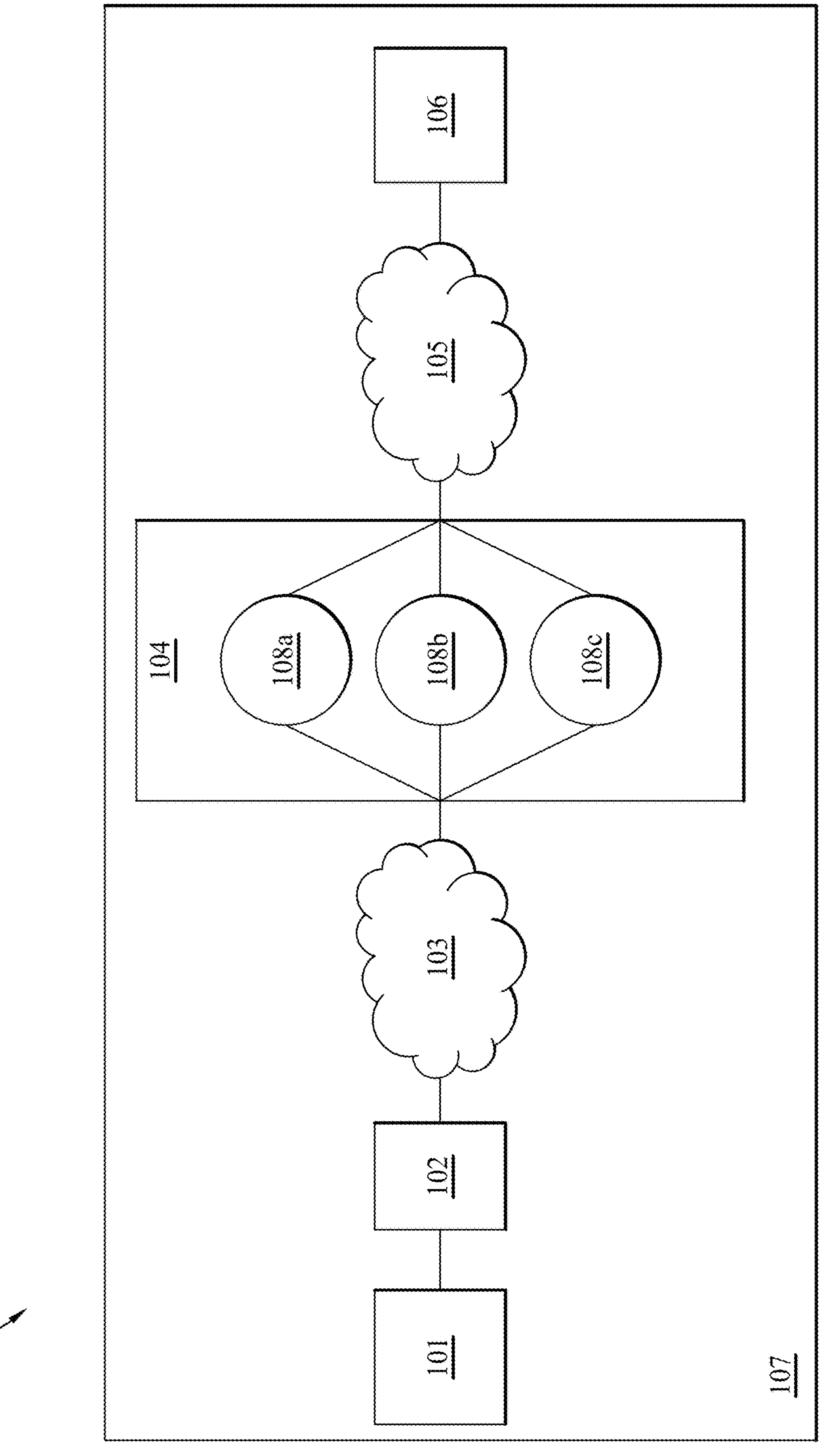
FIG. 1 illustrates an example system for asymmetrical routing of traffic in an SD-WAN environment, in accordance with certain embodiments.

Conventional approaches by communications providers to use asymmetrical routing and VFR lead to costly operations and extraneous bandwidth usage. Certain embodiments as described herein improve on these conventional approaches by linking a main flow of traffic to a sub-flow of traffic, such that asymmetrically routed packets and fragments can be efficiently transmitted without undergoing VFR.

According to one embodiment of the present disclosure, a method for fragmented packet forwarding includes receiving a primary flow table and a packet fragment, creating a secondary flow table, determining the primary flow owner of the initial fragment packet based on the secondary flow table and the primary flow table, and transmitting the packet fragment outside of the cluster of devices through at least the primary flow owner.

According to another embodiment, a system includes one or more processors and one or more computer-readable non-transitory storage media. The computer-readable non-transitory storage media embody instructions that, when executed by the one or more processors, cause the system to perform operations including receiving a primary flow table and a packet fragment, creating a secondary flow table, determining the primary flow owner of the initial fragment packet based on the secondary flow table and the primary flow table, and transmitting the packet fragment outside of the cluster of devices through at least the primary flow owner.

According to yet another embodiment, one or more computer-readable non-transitory storage media embody instructions that, when executed by a processor, cause the processor to perform operations including includes receiving a primary flow table and a packet fragment, creating a secondary flow table, determining the primary flow owner of the initial fragment packet based on the secondary flow table and the primary flow table, and transmitting the packet fragment outside of the cluster of devices through at least the primary flow owner.

Technical advantages of certain embodiments of this disclosure may include one or more of the following. Certain systems and methods described herein conserve networking, bandwidth and memory resources by reducing the number of times VFR may be needed or undergone in the course of transmitting data in a multi-node cluster network as compared to existing systems and methods for data transmission in multi-node cluster networks. Certain embodiments described herein conserve networking and memory resources by using flow tables that are linked to other flow tables to more efficiently transmit data, fragments, and/or packets via alternative routes or through alternative devices within a network that implements asymmetric routing.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
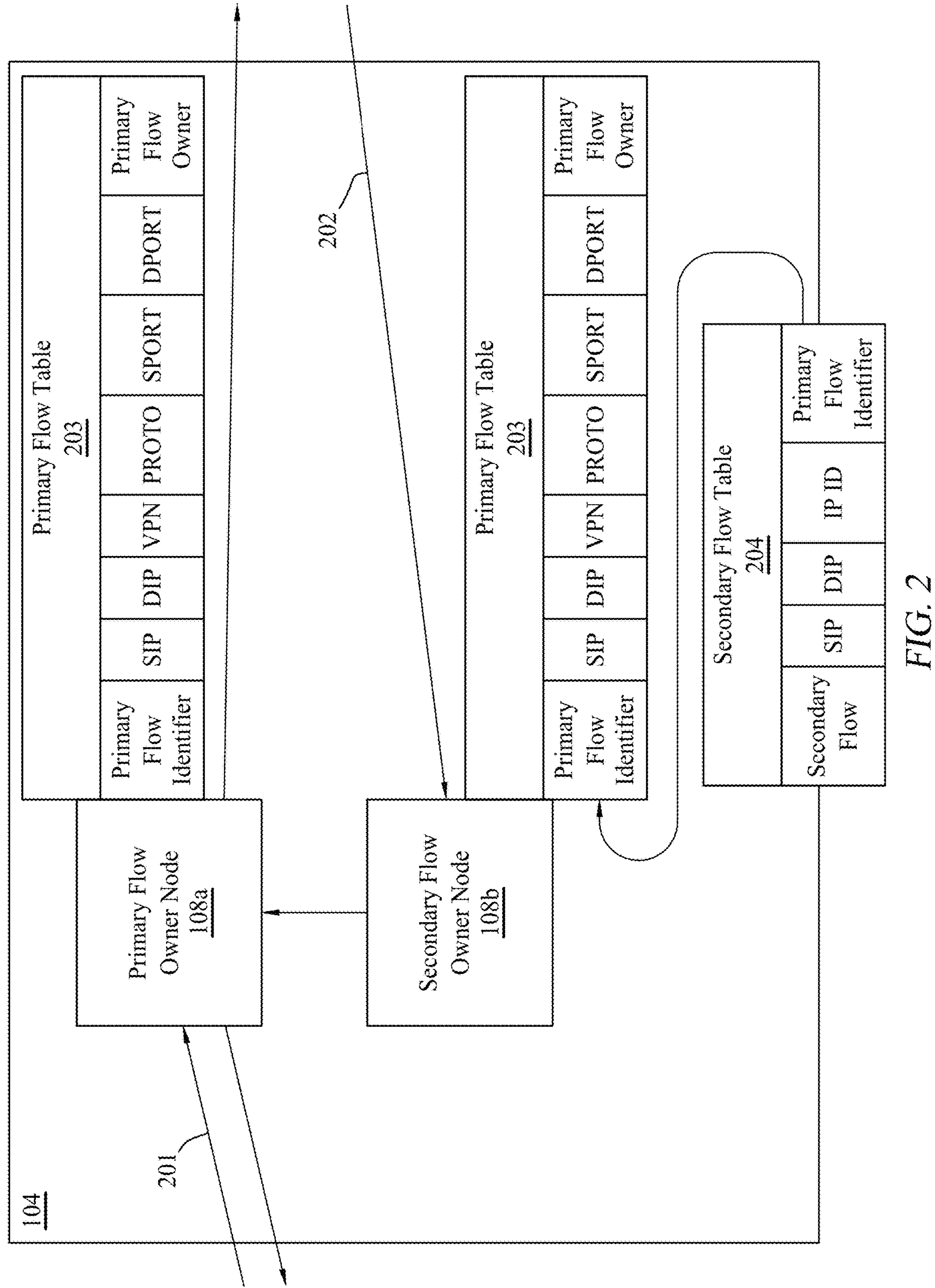
FIG. 2 illustrates a flow diagram for routing traffic in a multi-node cluster, in accordance with certain embodiments.
Figure 3:
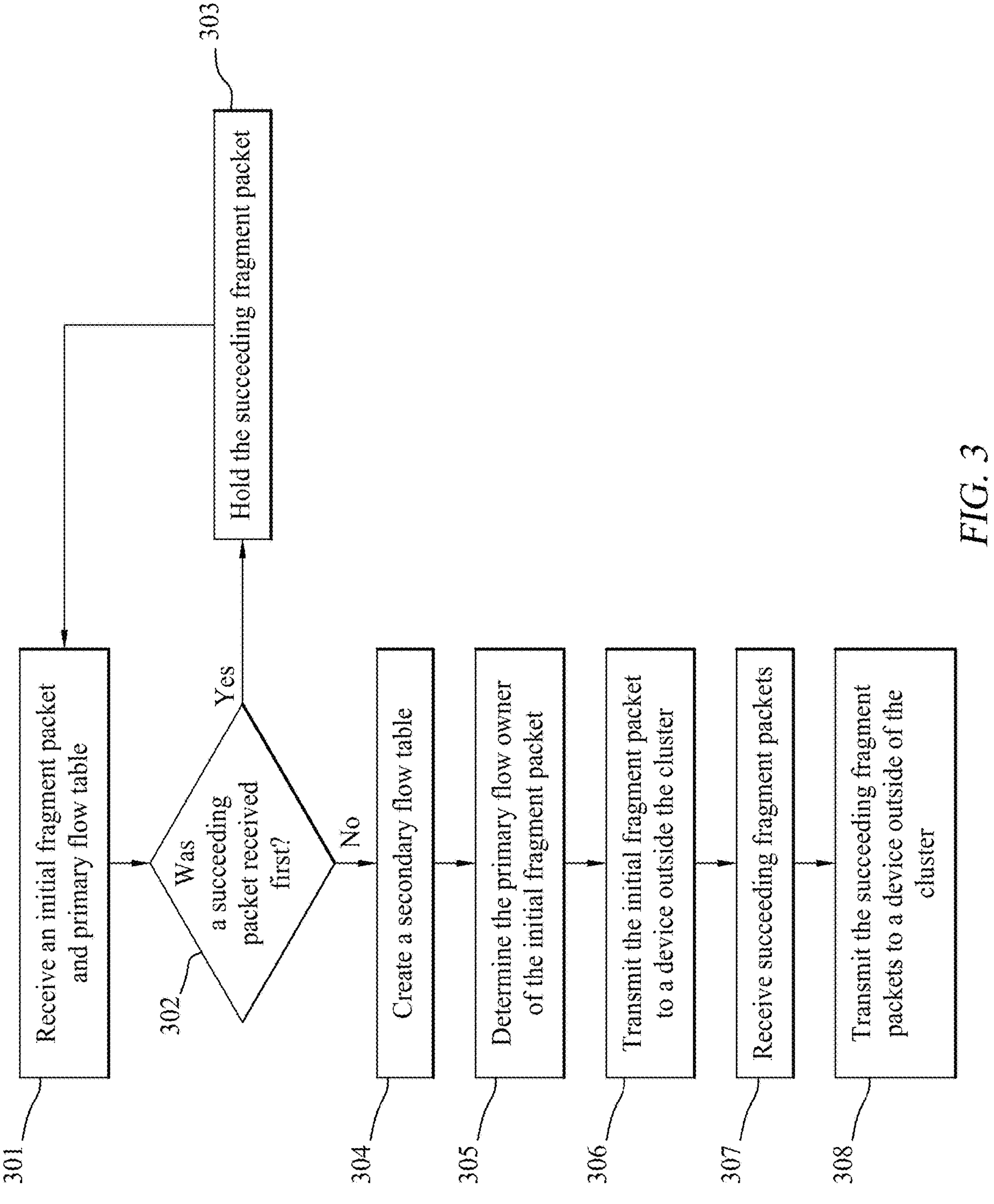
FIG. 3 illustrates a method for handling fragmented packets in multi-node all-active clusters, in accordance with certain embodiments.
Figure 4:
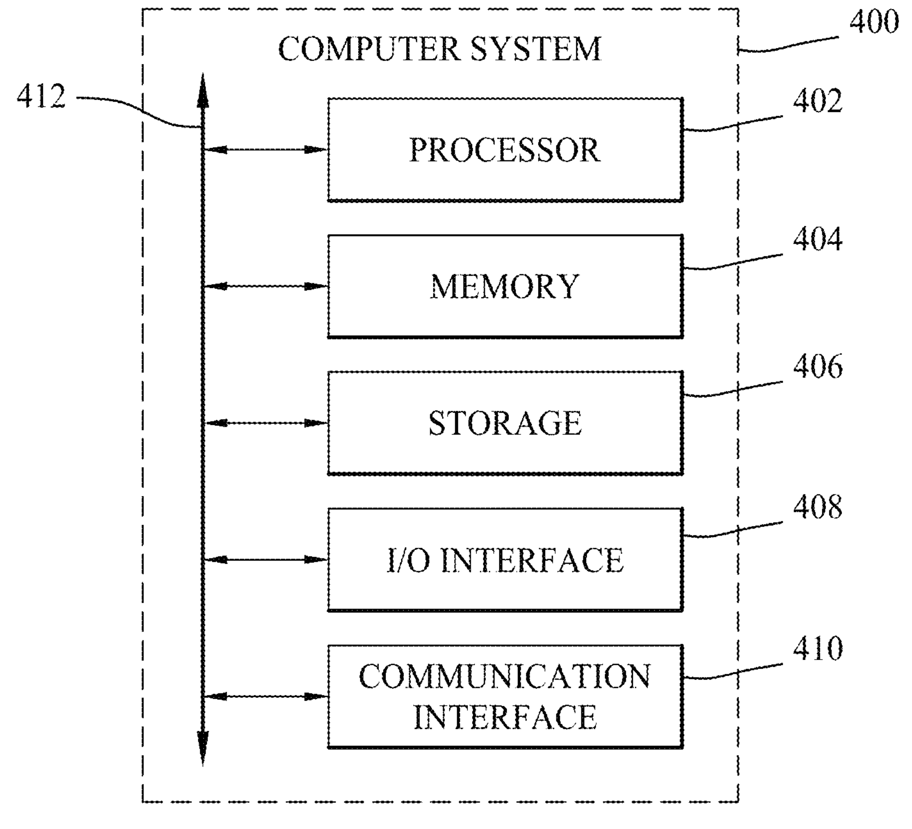
FIG. 4 illustrates an example of a computer system, in accordance with certain embodiments.

This disclosure describes an efficient method to handle fragmented packets in multi-node all-active clusters. FIG. 1 illustrates an example system for asymmetrical routing of traffic in an SD-WAN environment, in accordance with certain embodiments. FIG. 2 illustrates a flow diagram for routing traffic in a multi-node cluster, in accordance with certain embodiments. FIG. 3 illustrates a method for handling fragmented packets in multi-node all-active clusters, in accordance with certain embodiments. FIG. 4 illustrates an example of a computer system, in accordance with certain embodiments.

FIG. 1 is a diagram illustrating an example system 100 for asymmetrical routing of traffic in an SD-WAN environment, according to particular embodiments. The components of system 100 may include any suitable combination of hardware, firmware, and software. In the illustrated embodiment, system 100 includes a client device 101, a customer device 102, a SD-WAN cloud 103, a cluster 104, a data center LAN 105, a provider device 106, a network 107, and nodes 108*a-c*. In certain embodiments, traffic flows through system 100. In certain embodiments, traffic may flow from client device 101 to a customer device 102, to SD-WAN cloud 103, to cluster 104, to data center LAN 105, and to provider device 106. After traffic is received at provider device 106, traffic may flow back to client device 101 through the same components of system 100, e.g., from provider device 106 to data center LAN 105, to cluster 104, to SD-WAN cloud 103, to customer device 102, to client device 101.

Client device 101 represents any suitable computing or storage device that functions as a source of distributing, transmitting, or receiving traffic, including, but not limited to, data, fragments, and/or packets. Client device 101 may communicate information or transmit data to customer devices 102, or other devices within network 107 via any appropriate wireless or wired means. Examples of client devices 101 may include user devices, such as a desktop computer system, a laptop or notebook computer system, a mobile telephone, a PDA, a tablet computer system, an augmented/virtual reality device, etc. Additional examples of client devices 101 may include servers, mainframes, data centers, cloud platforms, or any other computer system capable of transmitting and/or distributing traffic.

Customer device 102 represents any suitable network device that facilitates communication between a customer's network and a network service provider's network. For example, a customer device 102 may include an edge router that is located on a customer's premises that provides an interface between the client device 101 and the network service provider's cluster 104 or provider device 106.

SD-WAN cloud 103 provides computer system resources (e.g., data storage and computing power) to multiple users (e.g., client devices 101 and customer devices 102) over the Internet. SD-WAN cloud 103 may be used to separate data and control planes. SD-WAN cloud 103 may include both hardware and software components. For example, SD-WAN cloud 103 may include one or more routers (e.g., cloud routers), applications, servers, and the like. SD-WAN cloud 103 may be managed by a single entity (e.g., a service provider). SD-WAN cloud 103 may provide access to one or more services, one or more intranets, and/or the Internet. For example, routers of SD-WAN cloud 103 may be SD-WAN edge routers that provide access to one or more intranets (e.g., enterprise branch or campus intranets). Intranets may host services such as printing services, Information Technology (IT) services, and the like. As another example, routers of SD-WAN cloud 103 may provide access to the Internet through a security gateway. In certain embodiments, SD-WAN cloud 103 may host one or more SD-WAN controllers, one or more components of data center LAN 105, and the like.

Cluster 104 represents any grouping of two or more border routers or network devices in system 100. Cluster 104 may include colocation sites (colo sites), regional point of presence (POP) sites, data centers, Internet Service Provider (ISP) POP sites, internet exchange points, or the like. In some embodiments, cluster 104 is operated by an ISP. In other embodiments, cluster 104 is operated by a single organization within a single network. In certain embodiments, cluster 104 is located between two different networks. In other embodiments, cluster 104 is located between different regions of the same network. In some embodiments, cluster 104 comprises a plurality of border routers in one device, such as, for example, a server. In other embodiments, cluster 104 comprises a plurality of border routers in separate devices, but in the same location. As illustrated in FIG. 1, cluster 104 may include nodes 108.

Data center LAN 105 represents a network of computing and storage resources that facilitates the distribution of SD-WAN policies within the SD-WAN environment. Data center LAN 105 may be associated with and/or controlled by an entity such as a service provider. Data center LAN 105 may serve as a POP between different components of system 100. Data center LAN 105 may include an SD-WAN edge router and a gateway. In some embodiments, a SD-WAN edge router and gateway may be combined into a single aggregation device. The aggregation device may support its remote access termination capabilities in combination with WAN edge functions for the combined capability of remote mobile client access to an SD-WAN domain.

Provider device 106 represents any suitable network device that facilitates communication between one network service provider's network and a cluster 104 or client device 101 or is capable of serving and/or receiving content using any internetworking protocol to any number of devices on computer network 107. A provider device 106 may include servers, edge routers and border routers. For example, provider devices 106 may facilitate communication between the client device 101 and the network provider's network or data servers. Provider device 106 may include web servers, database servers, email servers, web proxy servers, Domain Name System (DNS) servers, File Transfer Protocol (FTP) servers, file servers, virtual servers, application servers, and Dynamic Host Configuration Protocol (DHCP) servers. In some embodiments, provider device 106 may represent the cloud-based resources of network 107. Provider device 106 may comprise one or more network interfaces, at least one processor, and memory that is interconnected by a system bus as well as a power supply. Provider device 106 may include, in various embodiments, any number of suitable servers or other cloud-based resources.

In the illustrated embodiment, network 107 comprises two different networks: a SD-WAN Overlay Network and a LAN network. Each network is interconnected by a cluster 104. Cluster 104 comprises a plurality of nodes 108*a-c*. A SD-WAN overlay interconnects a customer device 102 with cluster 104. In the illustrated embodiment, for example, an initial flow of traffic may be routed from a client device 101 through customer device 102. Then the initial flow of traffic may be routed from the customer device 102 through a node 108*a* in cluster 104 and then through the data center LAN 105 to a provider device 106. Upon receiving the initial flow of traffic, the provider device 106 may route a transmission of packet(s) or fragment(s) in a return flow from the provider device 106 through data center LAN 105. Then the packet(s) or fragment(s) transmitted in a return flow of traffic may be routed from data center LAN 105 to another node 108*b*. Upon receiving the packet(s) or fragment(s) transmitted in a return flow, the other node 108*b* may divert the packet(s) or fragment(s) transmitted in a return flow to node 108*a* according to a link between the main flow and the sub flow, as described herein. Then the packet(s) or fragment(s) transmitted in a return flow may proceed through node 108*a* and then through the customer device 102 to the client device 101. For purposes of example and explanation, FIG. 1 shows certain connections between certain components (such as connections between certain devices in system 100). However, FIG. 1 does not imply a particular physical topology as the connections may be made via the cloud.

Nodes 108 represent any suitable network device that facilitates communication between endpoints in a first network and endpoints in a second network. Nodes 108 may include border routers and edge routers. Nodes may be interconnected to endpoints in each network by the public Internet, a multiprotocol label switching (MPLS) virtual private network (VPN), SD-WAN, LAN or the like. In some embodiments, nodes 108 represent any suitable network device that facilitates communication between end points in a first region of a network and a second region of a network.

In some embodiments, nodes represent any suitable network device that facilitates communication between endpoints within networks.

This same system may occur with any number of client devices 101, customer devices 102, SD-WAN clouds 103, clusters 104, data center LANs 105, provider devices 106, and nodes 108 in network 107. The system 100 is not limited to the number of exemplary components depicted in FIG. 1.

In an exemplary embodiment of operation, traffic may originate at a client device 101 and may then be transmitted through other devices in network 107 such as a customer device 102, a SD-WAN cloud 103, a node 108 within a cluster 104, a data center LAN 105, and/or a provider device 106. Traffic may then be transmitted back through the same devices in network 107 to reach the client device 101. In certain embodiments, the traffic may be transmitted asymmetrically such that the traffic is transmitted through different nodes 108 in cluster 104 on the way from client device 101 to provider device 106 and on the way from provider device 106 back to client device 101.

FIG. 2 illustrates a flow diagram for routing traffic in a multi-node cluster, in accordance with certain embodiments. The illustrated embodiment of FIG. 2 includes cluster 104 and nodes 108*a-b* as depicted in FIG. 1 as well as outgoing flow 201, return flow 202, primary flow table 203, and secondary flow table 204.

Outgoing flow 201 represents a transmission of packet(s) or fragment(s) between any suitable network devices in accordance with the Transmission Control Protocol (TCP). In certain embodiments, the packet(s) or fragment(s) transmitted in outgoing flow 201 may be received at one of the nodes 108*a-c*. The node 108*a-c* that receives the packet(s) or fragment(s) transmitted in outgoing flow 201 may become the primary flow owner node. In the illustrated embodiment, the packet(s) or fragment(s) transmitted in outgoing flow 201 enter cluster 104. In certain embodiments, for example, the packet(s) or fragment(s) transmitted in outgoing flow 201 may be transmitted from SD-WAN cloud 103 to a node 108*a*, making node 108*a* the primary flow owner node, and then transmitted from node 108*a* outside of cluster 104. In certain embodiments, the packet(s) or fragment(s) transmitted in outgoing flow 201 may be transmitted from node 108*a* to data center LAN 105.

Return flow 202 represents a transmission of packet(s) or fragment(s) between any suitable network devices in accordance with TCP. In certain embodiments, the packet(s) or fragment(s) transmitted in return flow 202 may be received at one of the nodes 108*a-c*. The node 108*a-c* that receives the packet(s) or fragment(s) transmitted in return flow 202 may become the secondary flow owner node. The secondary flow owner node is, generally, not the same node 108*a-c* that received the packet(s) or fragment(s) transmitted in outgoing flow 201 and became the primary flow owner node. In the illustrated embodiment, the packet(s) or fragment(s) transmitted in return flow 202 enter cluster 104. In certain embodiments, for example, the packet(s) or fragment(s) transmitted in return flow 202 may be transmitted from data center LAN 105 to node 108*b*, and then forwarded to node 108*a* based on primary flow table 203 and secondary flow table 204. In certain embodiments, the packet(s) or fragment(s) transmitted in return flow 202 may be transmitted from node 108*a* to SD-WAN cloud 103.

Primary flow table 203 represents a data structure that facilitates communication and transmission of data between devices in system 100. Primary flow table 203 may be created by networking devices in system 100 and may store and/or share certain information regarding received traffic flows or fragments. In certain embodiments, primary flow table 203 may include a primary flow identifier, a source IP (SIP) address, a destination IP (DIP) address, a Virtual Private Network (VPN), a Protocol identifier (PROTO), a Source Port (SPORT), a Destination Port (DPORT), and a primary flow owner. FIG. 2 illustrates an exemplary primary flow table 203 for handling fragmented packets, in accordance with certain embodiments. Though primary flow table 203 is depicted containing certain data, it may include or store any information relevant to the network, network devices, transmission of data, or fragmented packets.

Secondary flow table 204 represents a data structure that facilitates communication and transmission of data between devices in system 100. Secondary flow table 204 may be created by networking devices in system 100 and may store and/or share certain information regarding received traffic flows or fragments. In certain embodiments, secondary flow table 204 may include a secondary flow identifier, a SIP address, a DIP address, an IP identifier, and a primary flow identifier. FIG. 2 illustrates an exemplary secondary flow table 204 for handling fragmented packets, in accordance with certain embodiments. Though secondary flow table 204 is depicted containing certain data, it may include or store any information relevant to the network, network devices, transmission of data, or fragmented packets.

In an exemplary embodiment of operation, the packet(s) or fragment(s) transmitted in outgoing flow 201 are received at a node 108. When received at node 108, node 108 may create a primary flow table 203 that identifies the specific node 108 as the primary flow owner. The primary flow table 203 may be transmitted to the other multi-homed nodes 108 in cluster 104 via any suitable syncing mechanism or transmission technique. In certain embodiments, the primary flow table 203 may be transmitted by using any reliable method of transmission, e.g., TCP, User Datagram Protocol (UDP), Cisco Sync Agent, Cisco Intercluster Sync Agent, or other user synchronization tools from Cisco that allow for synchronization and data transmission between nodes 108 in the same cluster 104. The packet(s) or fragment(s) transmitted in outgoing flow 201 may then be transmitted out of cluster 104. The packet(s) or fragment(s) transmitted in return flow 202 may be transmitted into cluster 104 and received at a node 108. In certain embodiments, the system 100 implements asymmetric routing such that the node that receives the packet(s) or fragment(s) transmitted in outgoing flow 201 is not the same node 108 that receives the packet(s) or fragment(s) transmitted in return flow 202. For example, as illustrated, the packet(s) or fragment(s) transmitted in outgoing flow 201 may be received at node 108*a* and the packet(s) or fragment(s) transmitted in return flow 202 may be received at node 108*b*. When a node 108 receives the packet(s) or fragment(s) transmitted in return flow 202, the node 108 may create a secondary flow table 204. The node 108 may link the secondary flow table 204 to the primary flow table 203, such that the primary flow owner of the packet(s) or fragment(s) transmitted in outgoing flow 201 may be determined. For example, as illustrated, secondary flow table 204 may link to primary flow table 203 to determine that node 108*a* is the primary flow owner. The link between the secondary flow table 204 and the primary flow table 203 can be physical, virtual, wired, wireless, or an association between the two tables created based on the values contained within the tables. In certain embodiments, linking the secondary flow table 204 and the primary flow table 203 is accomplished by using the secondary flow table 204 and primary flow table 203 as look-up tables, or using the values contained within each table to form a link, or association, between the tables. For example, as illustrated, primary flow table 203 and secondary flow table 204 both contain the primary flow identifier, a node 108 may generate the secondary flow table 204 with the primary flow identifier, and then look to other flow tables stored to find the primary flow table 203 that contains the same primary flow identifier. Once the node 108 finds the primary flow table 203 that contains the same primary flow identifier, it may look within that primary flow table 203 to find the primary flow owner. In certain embodiments, the node 108 that received the packet(s) or fragment(s) transmitted in return flow 202 may then transmit or forward the packet(s) or fragment(s) transmitted in return flow 202 to the primary flow owner or other node 108 in cluster 104. For example, as illustrated, node 108*b* may transmit the packet(s) or fragment(s) transmitted in return flow 202 to node 108*a*. Node 108*a* may then transmit the packet(s) or fragment(s) transmitted in return flow 202 to a device outside of cluster 104.

In certain embodiments, nodes 108 may forward fragments, traffic, or the packet(s) or fragment(s) transmitted in outgoing flow 201 or the packet(s) or fragment(s) transmitted in return flow 202 to devices others than those depicted in FIG. 2 or discussed above. Although this disclosure depicts node 108*a* as the primary flow owner node and node 108*b* as the secondary flow owner node, any node 108 may be the primary flow owner node and/or the secondary flow owner node. Once a node 108 becomes a primary flow owner node or secondary flow owner node, it is not required to remain in that role for any given time.

Although this disclosure describes and illustrates an example method for handling fragmented packets in multi-node all-active clusters including the particular steps depicted in FIG. 2, this disclosure contemplates any suitable method for transmitting fragmented packets in multi-node clusters, including any suitable steps, which may include all, some, or none of the steps of the method of FIG. 2, where appropriate. Although this disclosure describes and illustrates particular steps of a method of FIG. 2 as occurring in a particular order, this disclosure contemplates any suitable steps of a method of FIG. 2 occurring in any suitable order. Although this disclosure describes and illustrates particular components, devices, or systems carrying out particular steps of a method of FIG. 2, this disclosure contemplates any suitable combination of any suitable components, devices, or systems carrying out any suitable steps of a method of FIG. 2.

In certain embodiments, a fragment packet may be transmitted within system 100. For example, the fragment packet may be transmitted from a client device 101 to any, or multiple, of the following: customer device 102, SD-WAN cloud 103, cluster 104. In certain embodiments, for example, the fragment packet may be transmitted from client device 101 to customer device 102 to SD-WAN cloud 103 to a node 108 in cluster 104. The fragment packet may be transmitted to any node 108 in cluster 104, for example, the fragment packet may be transmitted to node 108*a*. The fragment packet transmitted from a device in system 100 outside of cluster 104 to a node 108 in cluster 104 may be a packet or fragment transmitted in outgoing flow 201. In certain embodiments, the fragment packet may be further transmitted from a node 108 in cluster 104 to data center LAN 105 and/or a provider device 106. Provider device 106 and/or data center LAN 105 may then transmit the fragment packet to any of the nodes 108 in cluster 104. The fragment packet transmitted from data center LAN 105 or provider device 106 may be a packet or fragment transmitted in return flow 202.

In certain embodiments, an initial fragment packet and succeeding fragment packets are routed asymmetrically through system 100. Asymmetric routing may occur when a fragment packet is transmitted through different devices in system 100 during the transmission of packet(s) or fragment(s) in outgoing flow 201 and the transmission of packet(s) or fragment(s) in return flow 202. For example, during the transmission of packet(s) or fragment(s) in outgoing flow 201, the initial fragment packet may be transmitted through node 108*a* and during the transmission of packet(s) or fragment(s) in return flow 202, the same initial fragment packet may be transmitted through node 108*b*.

In certain embodiments, devices in system 100 may monitor the fragments. For example, each fragment packet may include a more fragment (M) bit indicating that more fragments will follow, a no more frag bit indicating that the fragment is the last fragment to be transmitted, or an offset bit indicating the starting position of the data in the fragment in relation to the start of the data in the original packet. In certain embodiments, devices in system 100 may monitor the M bits, no more frag bits, and offset bits of fragments transmitted within network 107. In certain embodiments, monitoring these bits allows the system 100 to determine when all fragments of a packet have been received and forwarded to the primary flow owner. In certain embodiments, after determining that all fragments of a packet have been received and forwarded to the primary flow owner, the system 100 may remove the secondary flow table 204.

In certain embodiments, fragment packets may be lost, destroyed, or altered in such a way that they are not received at a node 108 in return flow 202. In certain embodiments, the system 100 may run a timer such that if the fragment packets are not received by a certain time, the system 100 may remove the secondary flow table 204. In certain embodiments, the system 100 may also flush out the fragments that are waiting for the initial fragment packet to find the primary flow owner. In certain embodiments, the system may cancel transmission of packet(s) or fragment(s) if any related fragment(s) or packet(s) are lost. Certain embodiments offer a technical advantage of reducing storage and bandwidth capacity used by fragments that are still waiting in system 100 after a certain time has been exceeded.

These same steps may occur with any number of packet(s) or fragment(s) transmitted in outgoing flows 201, packet(s) or fragment(s) transmitted in return flows 202, primary flow tables 203, and secondary flow tables 204. The illustrated flow diagram is not limited to the number of exemplary steps depicted in FIG. 2.

FIG. 3 illustrates a method for handling fragmented packets in multi-node all-active clusters, in accordance with certain embodiments. Method 300 begins at step 301. At step 301, a node 108 receives an initial fragment packet. In certain embodiments, the initial fragment packet may be the first fragment of a packet. In certain embodiments, the initial fragment packet may be part of or all of the packet(s) or fragment(s) transmitted in return flow 202. In certain embodiments, the initial fragment packet may contain a M bit that indicates that it is the first fragment of a packet and more fragments from the same packet may follow and be received at the node 108. Method 300 then moves from step 301 to 302.

At step 302 of method 300, the node 108 determines if a succeeding packet was received before the initial fragment packet of the packet(s) or fragment(s) transmitted in return flow 202 was received at the node 108. If succeeding fragment packets of the same original packet were not received before the initial fragment packet, method 300 moves from step 302 to 304. If succeeding fragment packets of the same original packet were received before the initial fragment packet was received, method 300 moves from step 302 to step 303. For example, if an initial fragment packet was received at node 108*b*, then node 108*b* would determine if other succeeding packets of the same fragment had been received prior to receiving the initial fragment packet. If node 108*b* had not received any other succeeding packets before it received the initial fragment packet, method 300 moves from step 302 to 304. However, for example, if a succeeding fragment packet was received at node 108*b* before the initial fragment packet was received at node 108*b*, then method 300 moves from step 302 to 303. The initial fragment packet may be received at any node 108 or device in network 107.

At step 303 of method 300, the node 108 will hold the received succeeding fragment packet. While holding the received succeeding fragment packet, the node 108 will wait to receive an initial fragment packet at step 301. Method 300 moves from step 303 to 301.

At step 304 of method 300, the node that received the initial fragment packet of the packet(s) or fragment(s) transmitted in return flow 202 creates a secondary flow table 204. In certain embodiments, the secondary flow table 204 may include a secondary flow identifier and a primary flow identifier. In certain embodiments, The secondary flow identifier may be different from the primary flow identifier. For example, if a primary flow table 203 includes a primary flow identifier, "F1," relating to a packet or fragment transmitted in outgoing flow 201 received at node 108*a* and then a returning flow 202 was received at node 108*b*, node 108*b* may create a secondary flow table 204 with a secondary flow identifier, "F2." Method 300 then moves from step 304 to 305.

At step 305 of method 300, the node 108 that created the secondary flow table 204 may determine the primary flow owner of the initial fragment packet of the return flow 202. The node 108 may determine that information from the primary flow table 203 and the secondary flow table 204. In certain embodiments, the node 108 that creates a secondary flow table 204 may use the information stored in the secondary flow table 204, e.g., SIP, DIP, IP ID, and/or primary flow identifier, to link the secondary flow table 204 to the primary flow table 203. In certain embodiments, the primary flow identifier contained in both the primary flow table 203 and the secondary flow table 204 will be the same value and provide the node 108 with the information needed to link the two tables. For example, the node 108 that created the secondary flow table 204 may look to other tables stored for the same tuple information such as SIP, DIP, and IP ID. In certain embodiments, if the node 108 finds a match, then it may look to the primary flow identifier contained in the other tables stored. In certain embodiments, when node 108 finds a match of tuple information and a match of primary flow identifiers, the node 108 may link the two tables. The link between the secondary flow table 204 and the primary flow table 203 can be physical, virtual, wired, wireless, or an association between the two tables created based on the values contained within the tables. In certain embodiments, linking the secondary flow table 204 and the primary flow table 203 is accomplished by using the secondary flow table 204 and primary flow table 203 as look-up tables, or using the values contained within each table to form a link, or association, between the tables.

If the primary flow table 203 is a primary flow owner, the node 108 may search primary flow table 203 to determine the primary flow owner. For example, node 108*b* may create secondary flow table 204, which may include primary flow identifier "F1," and be linked to primary flow table 203 that may also include primary flow identifier "F1." Primary flow table 203 may also include a primary flow owner that stores that node 108*a* is the primary flow owner of the primary flow. Node 108*b* may search primary flow table 203 to determine that node 108*a* is the primary flow owner of the primary flow. Method 300 then moves from step 305 to 306.

At step 306 of method 300, the initial fragment packet is transmitted to a device outside of the cluster 104. The initial fragment packet may be transmitted via any of the devices in system 100. In certain embodiments, the initial fragment packet may be transmitted to multiple devices in system 100 before being transmitted to a device outside of the cluster 104. For example, the initial fragment packet may be received at node 108*b* and then node 108*b* may transmit it to other nodes 108. The initial fragment packet may then be transmitted outside of the cluster 104 to any combination of the following devices: client device 101, a customer device 102, and/or SD-WAN cloud 103. For example, the initial fragment packet may be transmitted from node 108*b* to node 108*a* to SD-WAN cloud 103 to customer device 102 to client device 101. Method 300 then moves from step 306 to 307.

At step 307 of method 300, a node 108 receives succeeding fragment packets. In certain embodiments, succeeding fragment packets are fragments of a packet that follow the initial fragment packet. In certain embodiments, the succeeding fragment packets are part of the same packet that was fragmented to create the initial fragment packet. For example, node 108*b* may receive the initial fragment packet and then may receive the succeeding fragment packets that arrive after the initial fragment packet. In an alternative embodiment, the succeeding fragment packets may be received at a node 108 before the initial fragment packet was received. Method 300 then moves from step 307 to step 308.

At step 308 of method 300, the succeeding fragment packets are transmitted to a device outside of the cluster 104. The succeeding fragment packets may be transmitted via any of the devices in system 100. In certain embodiments, the succeeding fragment packets may be transmitted to multiple devices in system 100 before being transmitted to a device outside of the cluster 104. For example, the succeeding fragment packets may be received at node 108*b* and then node 108*b* may transmit them to other nodes 108. The succeeding fragment packets may then be transmitted outside of the cluster 104 to any combination of the following devices: client device 101, a customer device 102, and/or SD-WAN cloud 103. For example, the succeeding fragment packets may be transmitted from node 108*b* to node 108*a* to SD-WAN cloud 103 to customer device 102 to client device 101.

In certain embodiments, before method 300 begins, the initial fragment packet may be transmitted within system 100. For example, the initial fragment packet may be transmitted from a client device 101 to any, or multiple, of the following: customer device 102, SD-WAN cloud 103, cluster 104. In certain embodiments, for example, the initial fragment packet may be transmitted from client device 101 to customer device 102 to SD-WAN cloud 103 to a node 108 in cluster 104. The initial fragment packet may be transmitted to any node 108 in cluster 104, for example, the initial fragment packet may be transmitted to node 108*a*. The transmission of the initial fragment packet from a device in system 100 outside of cluster 104 to a node 108 in cluster 104 may be a portion of the transmission of packet(s) or fragment(s) in outgoing flow 201. In certain embodiments, the initial fragment packet may be further transmitted from a node 108 in cluster 104 to data center LAN 105 and/or a provider device 106. Provider device 106 and/or data center LAN 105 may then transmit the initial fragment packet to any of the nodes 108 in cluster 104. This transmission of the initial fragment packet from data center LAN 105 or provider device 106 may be a portion of the transmission of packet(s) or fragment(s) in return flow 202. In certain embodiments, step 301 of method 300 may then begin when a node 108 in cluster 104 receives the initial fragment packet in a portion of the packet(s) or fragment(s) transmitted in return flow 202.

Although this disclosure describes and illustrates an example method 300 for a method for handling fragmented packets in multi-node all-active clusters including the particular steps of the method of FIG. 3, this disclosure contemplates any suitable method 300 for transmitting fragmented packets in multi-node clusters, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example of a computer system, in accordance with certain embodiments. In particular embodiments, one or more computer systems 400 provide functionality described or illustrated herein. As an example, one or more computer systems 400 may be used to provide at least a portion of system 100, a client device 101, a customer device 102, a SD-WAN cloud 103, a cluster 104, a data center LAN 105, a provider device 106, a network 107, and nodes 108*a-c* described with respect to FIG. 1. As another example, one or more computer systems 400 may be used to perform one or more steps described with respect to FIG. 4. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A teaches a method, comprising:

receiving, by a first node, a primary flow table and an initial fragment packet in a cluster of devices, wherein the primary flow table comprises at least tuple information and a primary flow identifier;

creating, by the first node, a secondary flow table comprising at least a portion of the tuple information and the primary flow identifier;

determining, by the first node, a primary flow owner of the initial fragment packet based on the secondary flow table and the primary flow table, wherein the primary flow owner is a second node in the cluster of devices; and transmitting, by the first node, the initial fragment packet to a device outside the cluster of devices through at least the primary flow owner.

2. The method of claim 1, further comprising linking the secondary flow table to the primary flow table by associating the primary flow identifier in the secondary flow table with the primary flow identifier in the primary flow table.

3. The method of claim 1, further comprising identifying the primary flow owner of the initial fragment packet in the primary flow table based on a linking of the secondary flow table to the primary flow table.

4. The method of claim 1, further comprising:

receiving a plurality of succeeding fragment packets at the first node; and transmitting the plurality of succeeding fragment packets to the device outside of the cluster of devices through at least the primary flow owner.

5. The method of claim 4, wherein transmitting the initial fragment packet and the plurality of succeeding fragment packets comprises the initial fragment packet and the plurality of succeeding fragment packets remaining separate.

6. The method of claim 4, further comprising:

monitoring the plurality of succeeding fragment packets transmitted; and removing the secondary flow table, wherein removing the secondary flow table occurs after the plurality of succeeding fragment packets have been transmitted to the primary flow owner.

7. The method of claim 4, further comprising:

receiving at the first node at least one of the plurality of succeeding fragment packets with a more fragment (M) bit set before the initial fragment packet is received at the first node; and holding the received at least one of the plurality of succeeding fragment packets until the initial fragment packet is received at the first node, wherein creating the secondary flow table occurs after the initial fragment packet is received at the first node.

8. The method of claim 4, further comprising when at least one of the plurality of succeeding fragment packets is lost, at least one of:

starting a timer;

removing the secondary flow table; and canceling transmission of the plurality of succeeding fragment packets.

9. A system, comprising:

one or more processors; and one or more computer-readable non-transitory storage media comprising instructions that, when executed by the one or more processors, cause one or more components of the system to perform operations comprising:

receiving a primary flow table and an initial fragment packet at a first node in a cluster of devices, wherein the primary flow table comprises at least tuple information and a primary flow identifier;

creating a secondary flow table comprising at least a portion of the tuple information and the primary flow identifier;

determining a primary flow owner of the initial fragment packet based on the secondary flow table and the primary flow table; and transmitting the initial fragment packet to a device outside the cluster of devices through at least the primary flow owner.

10. The system of claim 9, further comprising linking the secondary flow table to the primary flow table by associating the primary flow identifier in the secondary flow table with the primary flow identifier in the primary flow table.

11. The system of claim 10, further comprising identifying the primary flow owner of the initial fragment packet in the primary flow table based on a linking of the secondary flow table to the primary flow table.

12. The system of claim 9, further comprising:

receiving a plurality of succeeding fragment packets at the first node; and transmitting the plurality of succeeding fragment packets to the device outside of the cluster of devices through at least the primary flow owner.

13. The system of claim 12, wherein transmitting the initial fragment packet and the plurality of succeeding fragment packets comprises the initial fragment packet and the plurality of succeeding fragment packets remaining separate.

14. The system of claim 12, further comprising:

monitoring the plurality of succeeding fragment packets transmitted; and removing the secondary flow table, wherein removing the secondary flow table occurs after the plurality of succeeding fragment packets have been transmitted to the primary flow owner.

15. The system of claim 12, further comprising:

receiving at the first node at least one of the plurality of succeeding fragment packets with a more fragment (M) bit set before the initial fragment packet is received at the first node; and holding the received at least one of the plurality of succeeding fragment packets until the initial fragment packet is received at the first node, wherein creating the secondary flow table occurs after the initial fragment packet is received at the first node.

16. The system of claim 12, further comprising when at least one of the plurality of succeeding fragment packets is lost, at least one of:

running a timer;

removing the secondary flow table; and canceling transmission of the plurality of succeeding fragment packets.

17. One or more computer-readable non-transitory storage media embodying instructions that, when executed by a processor, cause performance of operations comprising:

receiving a primary flow table and an initial fragment packet at a first node in a cluster of devices, wherein the primary flow table comprises at least tuple information and a primary flow identifier;

creating a secondary flow table comprising at least a portion of the tuple information and the primary flow identifier;

determining a primary flow owner of the initial fragment packet based on the secondary flow table and the primary flow table; and transmitting the initial fragment packet to a device outside the cluster of devices through at least the primary flow owner.

18. The one or more computer-readable non-transitory storage media of claim 17, the operations further comprising:

linking the secondary flow table to the primary flow table by associating the primary flow identifier in the secondary flow table with the primary flow identifier in the primary flow table; and identifying the primary flow owner of the initial fragment packet in the primary flow table based on the linking of the secondary flow table to the primary flow table.

19. The one or more computer-readable non-transitory storage media of claim 17, the operations further comprising:

receiving a plurality of succeeding fragment packets at the first node; and transmitting the plurality of succeeding fragment packets to the device outside of the cluster of devices through at least the primary flow owner;

wherein transmitting the initial fragment packet and the plurality of succeeding fragment packets comprises the initial fragment packet and the plurality of succeeding fragment packets remaining separate.

20. The one or more computer-readable non-transitory storage media of claim 19, the operations further comprising:

receiving at the first node at least one of the plurality of succeeding fragment packets with a more fragment (M) bit set before the initial fragment packet is received at the first node;

holding the received at least one of the plurality of succeeding fragment packets until the initial fragment packet is received at the first node, wherein creating the secondary flow table occurs after the initial fragment packet is received at the first node; and monitoring the plurality of succeeding fragment packets transmitted, wherein when at least one of the plurality of succeeding fragment packets is lost, at least one of:

running a timer;

canceling transmission of the plurality of succeeding fragment packets; and removing the secondary flow table, wherein removing the secondary flow table occurs after the plurality of succeeding fragment packets have been transmitted to the primary flow owner.

* * * * *